United States Patent [19]

Diel

[11] Patent Number: 5,546,250

[45] Date of Patent: Aug. 13, 1996

[54] ELASTOMER GASKET THAT EXTENDS AROUND THE OUTER EDGE OF A HARD DRIVE

[75] Inventor: Mark Diel, Boulder, Colo.

[73] Assignee: Maxtor Corporation, San Jose, Calif.

[21] Appl. No.: 354,938

[22] Filed: Dec. 13, 1994

Related U.S. Application Data

[63] Continuation of Ser. No. 83,007, Jun. 24, 1993, abandoned.

[51] Int. Cl.⁶ .......................... G11B 33/08; G11B 33/14
[52] U.S. Cl. ........................................................ 360/97.02
[58] Field of Search ............................. 360/97.01, 97.02, 360/901–904; 361/683–685; 235/487–492

[56] References Cited

U.S. PATENT DOCUMENTS

| | | | |
|---|---|---|---|
| 4,639,863 | 1/1987 | Harrison | 360/97.01 |
| 4,896,231 | 1/1990 | Hoppe | 360/97.02 |
| 5,017,767 | 5/1991 | Mizuno | 235/492 |
| 5,025,336 | 6/1991 | Morehouse et al. | 360/97.01 |
| 5,150,267 | 9/1992 | Reinisch | 360/97.02 |
| 5,187,621 | 2/1993 | Tacklind | 360/97.02 |
| 5,243,495 | 9/1993 | Read et al. | 361/685 |

*Primary Examiner*—John H. Wolff
*Assistant Examiner*—George J. Letscher
*Attorney, Agent, or Firm*—Sheridan Ross & McIntosh

[57] ABSTRACT

A hard disk drive assembly which is small enough to meet the PCMCIA type I or type II formats and which has an outer layer of elastomer material which seals the assembly and absorbs external shock or vibrational loads applied to the drive unit. The disk drive unit includes a housing which encapsulates a magnetic disk and accompanying hardware required to read and write information onto the disk. The housing typically contains a cover plate and a base plate which are attached to a frame. Connected to the outer edges of the plates and frame is a layer of elastomer material. The elastomer seals the covers to the frame and absorbs external loads that are applied to the edges of the housing.

8 Claims, 3 Drawing Sheets

ELASTOMER GASKET THAT EXTENDS AROUND THE OUTER EDGE OF A HARD DRIVE

This is a continuation of application Ser. No. 08/083,007 filed on Jun. 24, 1993, now abandoned.

BACKGROUND OF THE INVENTION

1. Field of the Invention

The present invention relates to a portable disk drive assembly which has an outer layer of elastomer material which both seals the assembly and absorbs external shock or vibrational loads that are applied to the disk drive.

2. Description of Related Art

Most computer systems include a massive memory storage device such as a hard disk drive. Hard disk drive units contain a magnetic disk that is capable of storing a large amount of binary information. The magnetic disk is typically coupled to a hub which is rotated by an electric motor. The drive unit also has a head that magnetizes and senses the magnetic field of the disk. The head is typically located at the end of an actuator arm which can move relative to the magnetic disk. The actuator arm, motor and other components of a typical disk drive unit are relatively small and fragile, and are therefore susceptible to damage when subjected to excessive external shock loads or vibration. For this reason, hard disk drives are typically rigidly mounted to the housing of the computer system by screws or other fastening means.

Hard disk drives contain programs and other information that are vital to the user. It is sometimes desirable to transfer such information to a different computer system. Transferring programs from a hard disk typically requires loading the information onto a floppy disk, or sending such information over a phone line. Such methods can be time consuming, particularly if the program is long or there is a large amount of data. There have been developed portable hard disk drives which can be plugged into a slot in the computer. To reduce the amount of possible component damage to the drive unit, the housing and assembly are typically constructed to be quite rugged. These rugged assemblies are typically heavy and bulky, and generally impractical to carry and store.

The Personal Computer Memory Card International Association (PCMCIA) has recently promulgated specifications for portable memory cards which can be plugged into slots within a computer. The PCMCIA standard includes a type I format, a type II format and a type III format, each format being distinguished by a different card thickness. Memory can be added to a computer by merely plugging in an additional card. Similarly, a modem or facsimile (FAX) card can be added to a system with a push of the hand. The standardized format of the card allows a user to plug the memory card of one computer into another computer regardless of the type or make of either system.

The standardized cards are approximately the size of a credit card and include a connector which mates with a connector in the computer. The small size of the card provides an electronic assembly that is easy to carry and store. It would be very desirable to have a hard disk drive unit which conforms with the PCMCIA format, so that the disk drive can be readily carried and plugged into an existing slot of a computer. Such a hard disk card must be rugged enough to withstand the large shock loads that may be applied to the drive unit, such as by dropping the card onto a hard surface. It would therefore be desirable to have a hard disk drive unit which would be small enough to meet the PCMCIA format and rugged enough to be used as a portable disk drive unit.

SUMMARY OF THE INVENTION

The present invention is a hard disk drive assembly which is small enough to meet the PCMCIA type I or type II formats and which has an outer layer of elastomer material which seals the assembly and absorbs external shock or vibrational loads applied to the drive unit. The disk drive unit includes a housing which encapsulates a magnetic disk and accompanying hardware required to read and write information onto the disk. The housing typically contains a cover plate and a base plate which are attached to a frame. Connected to the outer edges of the plates and frame is a layer of elastomer material. The elastomer seals the covers to the frame as well as absorbing external loads that are applied to the edges of the housing.

It therefore is an object of the present invention to provide a disk drive that complies with the PCMCIA type I and II formats, and which can absorb external shock and vibrational loads.

It is also an object of the present invention to provide a PCMCIA type I or type II disk drive that has a single component which both seals the assembly and absorbs external shock and vibrational loads.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
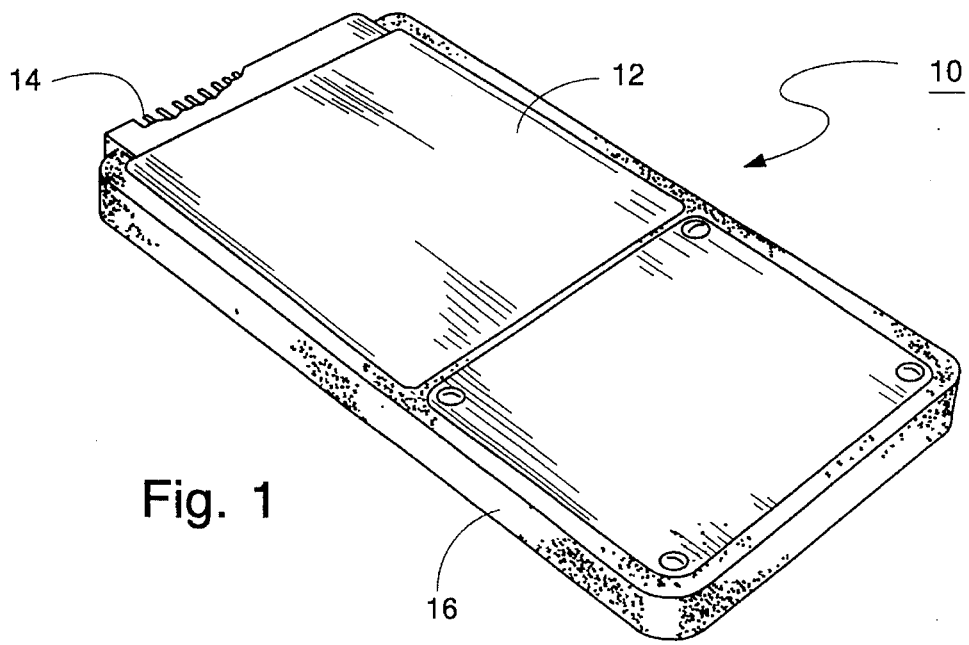
FIG. 1 is a perspective view of a hard disk drive assembly which has a layer of elastomer material around an outer edge of the disk drive housing.

Referring to the drawings more particularly by reference numbers, FIG. 1 shows a hard disk drive card unit 10 of the present invention. The unit 10 includes a housing 12 and an electrical connector 14. In the preferred embodiments, the housing 12 has the dimensions of 85.6×54.0×5.0 millimeters, or 85.6×54.0×3.3 millimeters. The dimensions conform with the specifications issued by the Personal Computer Memory Card International Association (PCMCIA) for a type I or type II electronic card. The PCMCIA is an association that has promulgated a specification which list dimensions and other requirements for standard electronic cards. Each computer that conforms with the PCMCIA specification will contain slots that can receive a standardized card. With such a standard, electronic cards of one computer can be readily plugged into another computer, regardless of the model or make of the computers.

The PCMCIA standard includes three types of cards which each have varying thicknesses. A type I card is approximately 3.3 millimeters thick, a type II card is approximately 5.0 millimeters thick and a type III card is approximately 10.5 millimeters thick. The computer has a plurality of adjacent slots that are wide enough to receive a type II card. Both the type I and II cards occupy a single slot, while the type III card occupies two slots. Each computer slot contains a 68 pin connector that is typically mounted to a motherboard to provide an interconnect to the computer system. The connector 14 plugs into the 68 pin connector when the card is installed into the computer.

The card unit 10 has a layer of elastomer material 16 which extends around the outer edge of the housing 12. The elastomer material 16 is typically constructed to absorb external shock or vibrational loads that are applied to the edges of the drive unit 10. For example, the user may drop the card 10 onto a hard surface which will create a shock force that is transmitted to the disk drive 10. If the card unit strikes the edge of the disk drive, the force of the impact will be absorbed by the elastomer material 16.

Figure 2:
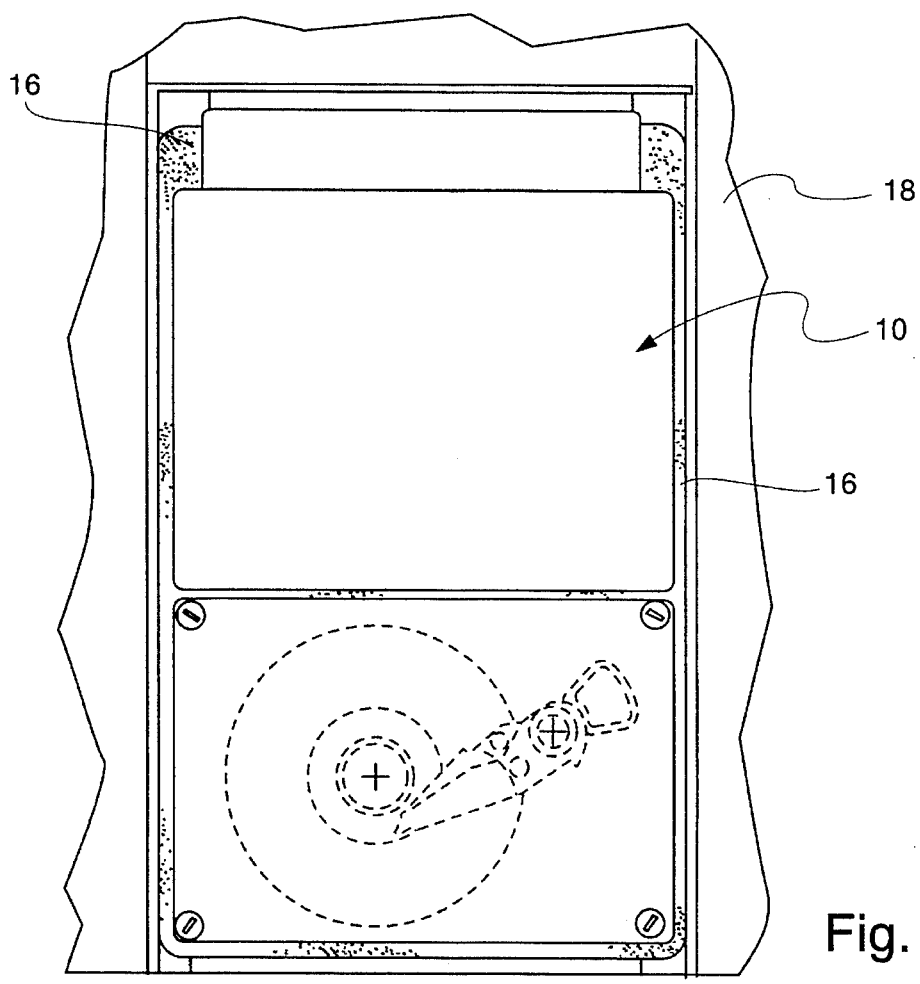
FIG. 2 is a top view of the hard disk drive inserted into a computer housing.

FIG. 2 shows the card unit installed into a computer chassis 18. The computer may be subjected to shock or vibrational loads which are directed toward the edge of the disk drive 10. The shock or vibrational loads of the computer are again dampened by the elastomer material 16.

In the preferred embodiment, the elastomer material is approximately 0.040 inches thick and constructed from a urethane having a durometer reading of 70, Shore A. Such a construction can absorb an external shock load of up to 500 g's. The elastomer must also have a relatively long operating life even when exposed to excessive temperatures, humidity, UV, gases, etc.

Figure 3:
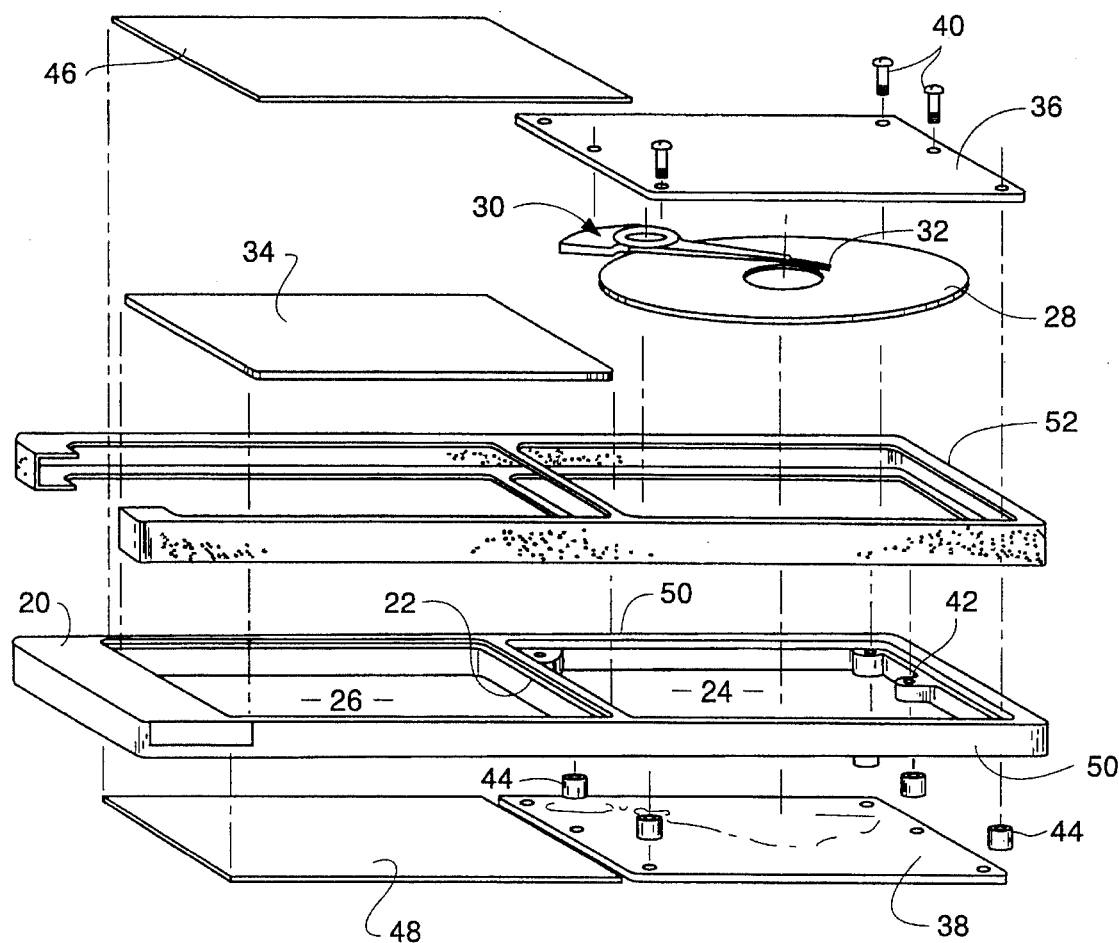
FIG. 3 is an exploded view of a hard disk drive of the present invention which complies with the PCMCIA type I format.

FIG. 3 shows a card unit that can comply with the PCMCIA type I format. The housing includes a frame 20 which has a support beam 22 that separates two cavities 24 and 26. The first cavity 24 typically contains a magnetic disk 28 which is coupled to an electric motor (not shown) that rotates the disk 28. Adjacent to the magnetic disk 28 is an actuator arm assembly 30 that contains a magnetic head 32 which is adapted to magnetize and sense the magnetic field of the disk 28. The second cavity 26 may contain a printed circuit board (PCB) 34 which contains the various electrical components required to operate the disk drive 10.

The magnetic disk 28 is typically encapsulated by a disk cover plate 36 and a disk base plate 38. The plates 36 and 38 are coupled together by screws 40 that extend through bosses 42 in the frame 20. Within the bosses 42 are sleeves 44 which separate the plates 36 and 38. The PCB 34 is typically encapsulated by a circuit cover plate 46 and a circuit base plate 48. The plates 46 and 48 may be attached to the frame 20 by an adhesive or other attachment means.

Located around the edges 50 and support beam 22 of the frame 20 is a layer of elastomer material 52. The elastomer layer 52 may be attached to the frame 20 by any means including bonding, curing or insertion molding. The elastomer 52 covers all of the edges of the card unit except the connector 14.

Figures 4, 5, 6:
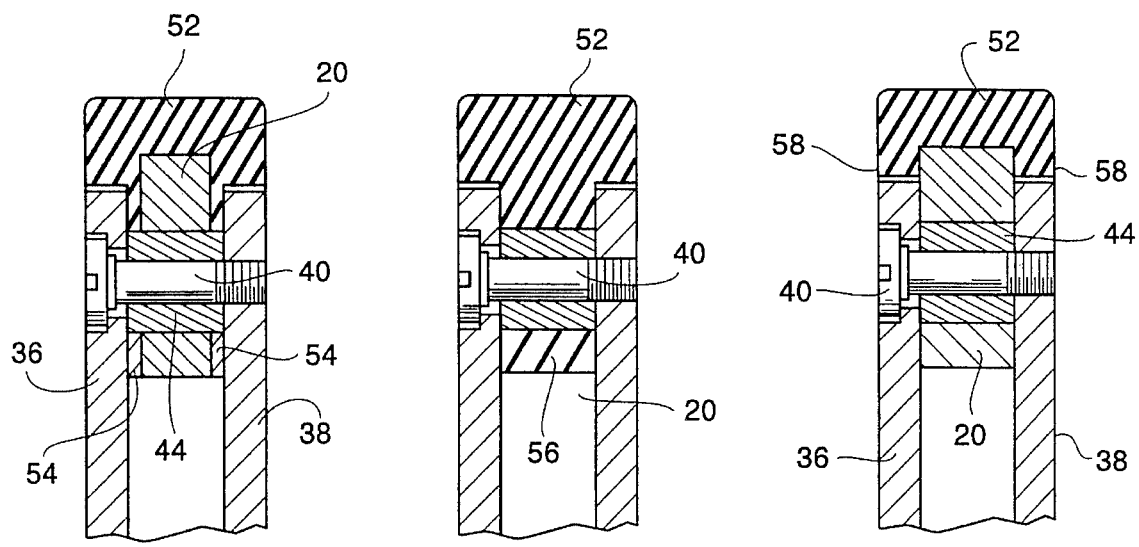
FIG. 4 is an enlarged cross-sectional view of an assembled hard disk drive.
FIG. 5 is an alternate embodiment of the hard disk drive of FIG. 4.
FIG. 6 is an alternate embodiment of the hard disk drive of FIG. 4.

As shown in FIG. 4 the elastomer 52 covers the outer edges of the frame 20 and the plates 36 and 38, to seal the first cavity 24 and the magnetic disk 28. The elastomer material immediately adjacent to the plates 36 and 38 is typically in compression to improve the seal of the card unit. The elastomer 52 may have a pair of ridges 54 located between the plates and the frame to further improve the seal of the disk drive assembly. FIG. 5 shows an alternate embodiment, wherein the plates are longer than the frame and the elastomer has a middle flange 56 that is contiguous with the outer edge of the frame 20. FIG. 6 shows another alternate embodiment, wherein the frame is longer than the plates and the inside surfaces of the plates are in contact with the outer surfaces of the frame. In this embodiment, the elastomer 52 has a pair of arms 58 that are adjacent to the plates 36 and 38.

Figure 7:
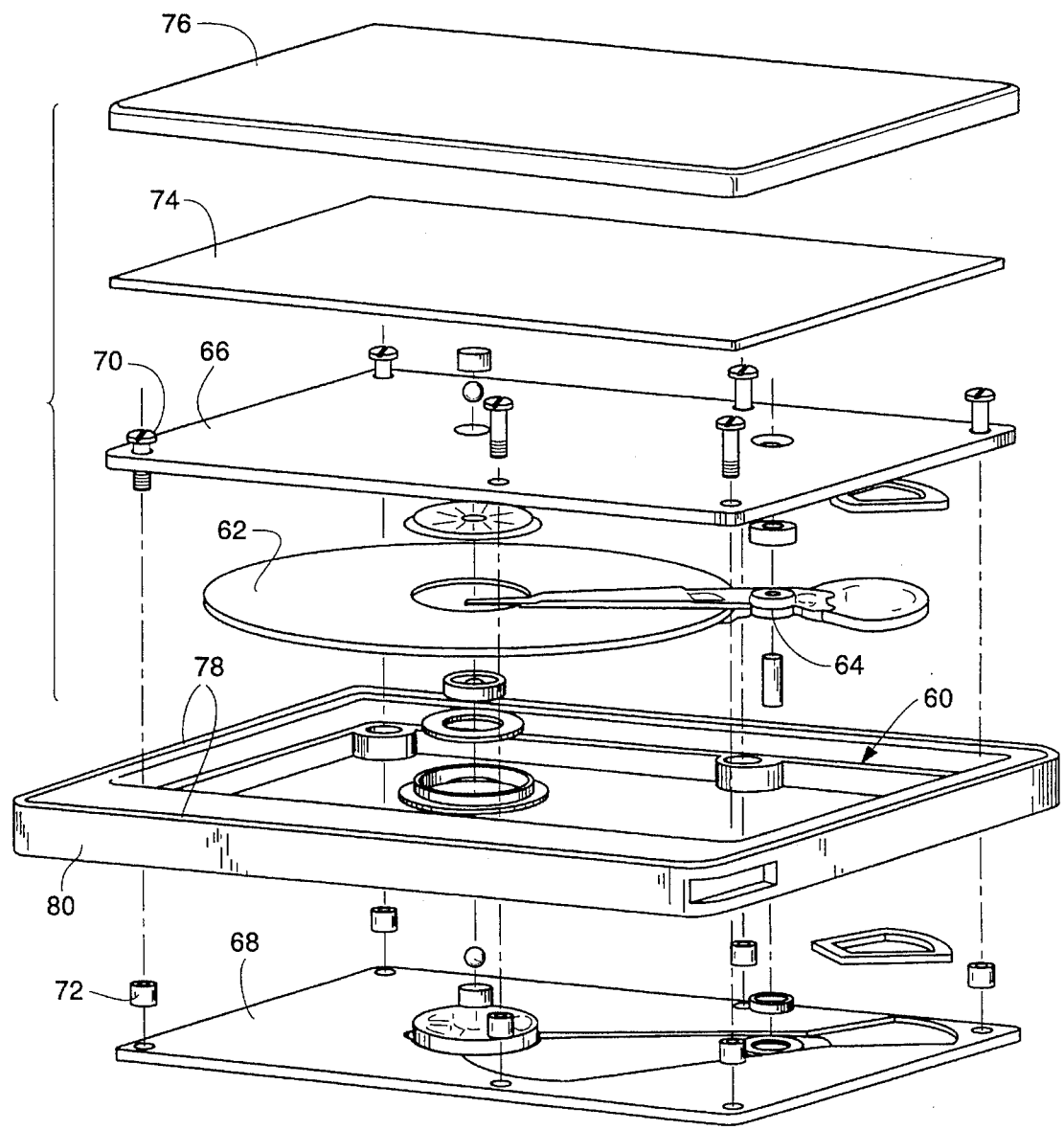
FIG. 7 is an exploded view of a hard disk drive of the present invention which complies with the PCMCIA type II format.

FIG. 7 shows a card unit that can comply with the PCMCIA type II format. The housing includes a frame 60 which contains a magnetic disk 62 and an actuator arm assembly 64. The disk 62 and assembly 64 are encapsulated by a cover plate 66 and a base plate 68 which are coupled together by screws 70 that extend through spacer sleeves 72. Adjacent to the cover plate 66 is a printed circuit board 74 which is encapsulated by a PCB cover plate 76. The outer edges 78 of the frame 60 are covered with elastomer material 80 as described above.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive assembly, comprising:

a frame that has a first side, a second opposite side and an outer edge;

a cover plate attached adjacent to said first side of said frame, said cover plate having an outer edge;

a base plate attached adjacent to said second side of said frame, said base plate having an outer edge;

a magnetic disk that has a radial axis and is located within said frame;

an actuator arm assembly coupled to said magnetic disk; and, a dampening member that is attached to and extends from said outer edge of said frame, said cover plate and said base plate in a direction that is essentially parallel with the radial axis of said magnetic disk, and which absorbs energy applied to said housing and seals said magnetic disk, wherein:

(i) said dampening member is distinct from said cover plate, said base plate and said frame;

(ii) said dampening member has height measured in a direction parallel to said outer edge and width measured in a direction parallel to said radial axis of said magnetic disk;

(iii) said height of said dampening member is substantially equal to the height of said disk drive assembly;

(iv) said dampening member extends in a direction parallel to said radial axis of said magnetic disk in an outward direction away from the center of said housing beyond said outer edges of said frame, of said cover plate and said plate; and (v) said dampening member contacts the outer edge of at least one of said frame, said cover plate and said base plate on at least three sides of said assembly.

2. The assembly as recited in claim 1, wherein said dampening member is a layer of elastomer material which is attached to said frame, and adjacent to said cover plate and said baseplate.

3. The assembly as recited in claim 2, wherein said dampening member has a pair of ridges located between said frame and said plates.

4. The assembly as recited in claim 2, wherein said dampening member is constructed from a urethane which has a durometer reading of approximately 70, shore A.

5. The assembly as recited in claim 1, wherein said frame, said cover plate and said base plate have a combined thickness of approximately 5.0 millimeters.

6. The assembly as recited in claim 1, wherein said frame, said cover plate and said base plate have a combined thickness of approximately 3.3 millimeters thick.

7. The assembly as recited in claim 1, wherein said dampening member contacts said outer edge of said cover plate and said outer edge of said base plate.

8. The assembly as recited in claim 1, wherein said dampening member extends in a direction parallel to said radial axis of said magnetic disk toward the center of said housing so as to contact said first side of said frame, said second side of said frame, a bottom surface of said cover plate and a top surface of said base plate.

* * * * *